(12) United States Patent
Shang et al.

(10) Patent No.: US 8,399,065 B2
(45) Date of Patent: Mar. 19, 2013

(54) IN-SITU DEPOSITION OF BATTERY ACTIVE LITHIUM MATERIALS BY THERMAL SPRAYING

(75) Inventors: Quanyuan Shang, Saratoga, CA (US); Lu Yang, Milpitas, CA (US); Karl M. Brown, San Jose, CA (US); Donald J. K. Olgado, Palo Alto, CA (US); Victor Pebenito, San Jose, CA (US); Hooman Bolandi, San Jose, CA (US); Tetsuya Ishikawa, Saratoga, CA (US); Robert Z. Bachrach, Burlingame, CA (US); Liang-Yuh Chen, Foster City, CA (US)

(73) Assignee: Applied Materials, Inc., Santa Clara, CA (US)

( * ) Notice: Subject to any disclaimer, the term of this patent is extended or adjusted under 35 U.S.C. 154(b) by 147 days.

(21) Appl. No.: 12/862,265

(22) Filed: Aug. 24, 2010

(65) Prior Publication Data

US 2011/0045170 A1 Feb. 24, 2011

Related U.S. Application Data

(60) Provisional application No. 61/236,387, filed on Aug. 24, 2009.

(51) Int. Cl.
| | |
|---|---|
| *C23C 4/10* | (2006.01) |
| *C23C 4/00* | (2006.01) |
| *B05D 1/08* | (2006.01) |
| *B05D 1/02* | (2006.01) |
| *B05D 3/14* | (2006.01) |
| *C01B 13/14* | (2006.01) |
| *C01D 1/00* | (2006.01) |

(52) U.S. Cl. ........ 427/453; 427/446; 427/447; 427/562; 427/564; 423/592.1; 423/641

(58) Field of Classification Search .................. 423/335, 423/337, 592.1, 594.19, 641; 427/446, 447, 427/450, 451, 453, 562, 564, 576, 577
See application file for complete search history.

(56) References Cited

U.S. PATENT DOCUMENTS

| | | | |
|---|---|---|---|
| 5,958,362 A * | 9/1999 | Takatori et al. | ............ 423/593.1 |
| 6,514,640 B1 | 2/2003 | Armand et al. | |
| 6,863,699 B1 | 3/2005 | Krasnov et al. | |
| 7,112,758 B2 | 9/2006 | Ma et al. | |
| 7,491,469 B2 | 2/2009 | Guidotti et al. | |

(Continued)

FOREIGN PATENT DOCUMENTS

| | | |
|---|---|---|
| JP | 8329945 A | 12/1996 |
| JP | 2003217584 A | 7/2003 |
| JP | 2009062256 A | 3/2009 |
| JP | 2009302044 A | 12/2009 |
| WO | WO-2009023744 A1 | 2/2009 |

OTHER PUBLICATIONS

International Search Report mailed May 2, 2011, in PCT application PCT/US2010/046498.

(Continued)

*Primary Examiner* — Michael Cleveland
*Assistant Examiner* — Michael Wieczorek
(74) *Attorney, Agent, or Firm* — Patterson & Sheridan, LLP (57) ABSTRACT

A method and apparatus for forming an electrochemical layer of a thin film battery is provided. A precursor mixture comprising electrochemically active precursor particles dispersed in a carrying medium is provided to a processing chamber and thermally treated using a combustible gas mixture also provided to the chamber. The precursor is converted to nanocrystals by the thermal energy, and the nanocrystals are deposited on a substrate. A second precursor may be blended with the nanocrystals as they deposit on the surface to enhance adhesion and conductivity.

15 Claims, 8 Drawing Sheets

U.S. PATENT DOCUMENTS

| | | |
|---|---|---|
| 7,521,097 B2 | 4/2009 | Horne et al. |
| 7,713,662 B2 | 5/2010 | Tabuchi et al. |
| 2002/0192137 A1 | 12/2002 | Chaloner-Gill et al. |
| 2004/0033360 A1* | 2/2004 | Armand et al. ............... 428/408 |
| 2006/0165910 A1* | 7/2006 | Kodas et al. .................. 427/446 |
| 2008/0280189 A1 | 11/2008 | Kesler et al. |
| 2008/0311306 A1 | 12/2008 | Xiao et al. |
| 2009/0013522 A1 | 1/2009 | Honda et al. |
| 2009/0217512 A1 | 9/2009 | Tian et al. |

OTHER PUBLICATIONS

Wang, et al.; Plasma spray synthesis of ultra-fine YSZ powder; Journal of Power Sources 170 (2007) pp. 145-149.

Ye, et al.; Novel Design and Fabrication of Thermal Battery Cathodes Using Thermal Spray; Mat. Res. Soc. Symp. Proc. vol. 548 (1999) pp. 701-707.

* cited by examiner

IN-SITU DEPOSITION OF BATTERY ACTIVE LITHIUM MATERIALS BY THERMAL SPRAYING

CROSS-REFERENCE TO RELATED APPLICATIONS

This application claims benefit of U.S. Provisional Patent Application 61/236,387, filed Aug. 24, 2009, which is incorporated by reference herein.

FIELD

Embodiments of the present invention relate generally to lithium-ion batteries, and more specifically, to a method of fabricating such batteries using thin-film deposition processes.

BACKGROUND

Fast-charging, high-capacity energy storage devices, such as supercapacitors and lithium (Li) ion batteries, are used in a growing number of applications, including portable electronics, medical devices, transportation, grid-connected large energy storage, renewable energy storage, and uninterruptible power supplies (UPS). In modern rechargeable energy storage devices, the current collector is made of an electric conductor. Examples of materials for the positive current collector (the cathode) include aluminum, stainless steel, and nickel. Examples of materials for the negative current collector (the anode) include copper (Cu), stainless steel, and nickel (Ni). Such collectors can be in the form of a foil, a film, or a thin plate, having a thickness that generally ranges from about 6 to 50 μm.

A typical lithium ion battery consists of a carbon anode and a lithium metal oxide or phosphate cathode separated by an electrolyte liquid consisting of a lithium salt such as $LiPF_5$, $LiBF_4$, or $LiClO_4$ in an organic solvent such as ethylene carbonate, or by a solid polymer electrolyte, such as polyethylene oxide, complexed with lithium salts and/or filled with liquid electrolytes. The cathode material is typically selected from lithium transition metal oxides, such as $LiMn_2O_4$, $LiCoO_2$, $LiNiO_2$, or combinations of Ni, Li, Mn, and Co oxides and includes electroconductive particles, such as carbon or graphite, and binder material. The cathode material is considered to be a lithium-intercalation compound, in which the quantity of conductive material is in the range from about 0.1% to about 15% by weight. The cathode material may be applied to a conductive sheet electrode as a paste and compacted between hot rollers, or sprayed on as a solution or slurry, and the resulting substrate dried to remove the liquid carrier.

Graphite is frequently used as the anode material and can be in the form of a lithium-intercalation meso-carbon micro bead (MCMB) powder made up of MCMBs having a diameter of approximately 10 μm. The lithium-intercalation MCMB powder is dispersed in a polymeric binder matrix. The polymers for the binder matrix are made of thermoplastic polymers including polymers with rubber elasticity. The polymeric binder serves to bind together the MCMB material powders to preclude crack formation and prevent disintegration of the MCMB powder on the surface of the current collector. The quantity of polymeric binder is in the range of about 0.5% to about 15% by weight. The polymer/MCMB mixture may be applied as a paste and compacted between hot rollers, or in a liquid solution, and the resulting substrate dried to remove the solvent.

Some Li-ion batteries use separators made from microporous polyolefin polymer, such as polyethylene foam, which are applied in a separate manufacturing step. The separator is generally filled with a liquid electrolyte, as described above, to form the finished battery.

As the use of thin-film Li-ion batteries continues to grow, there is an ongoing need for thin-film Li-ion batteries that are smaller, lighter, and can be more cost effectively manufactured.

SUMMARY

Embodiments described herein provide a method of forming a layer on a substrate by providing a first precursor to a processing chamber, coupling energy into the first precursor to form an activated precursor, directing the activated precursor toward the substrate, blending the activated precursor with a second precursor to form a deposition mixture, and depositing a layer comprising nanocrystals formed from the activated precursor on the substrate.

Other embodiments provide an apparatus for forming an electrochemical film on a substrate, the apparatus having a processing chamber enclosing a substrate support and a dispenser, the dispenser comprising an activation chamber in fluid communication with a precursor source, a source of electric power coupled to the activation chamber, a mixing region in fluid communication with the activation chamber, the mixing region having an exit oriented toward the substrate support, and a first conduit having an opening disposed near the substrate support and spaced apart from the mixing region.

Other embodiments provide an apparatus for forming an electrochemical film on a conductive surface of a substrate, the apparatus having a continuously moving substrate conveyor, and a dispenser disposed above the substrate conveyor, the dispenser having an activation chamber with a plurality of nozzles extending toward the substrate conveyor and oriented in a direction perpendicular to the direction of motion of the substrate conveyor, the activation chamber in fluid communication with one or more sources of electrochemical precursors, a source of electric power coupled to the activation chamber, an annular conduit disposed around each nozzle for carrying a combustible gas mixture to a mixing zone at the end of each nozzle, and a plurality of heads disposed near the substrate conveyor and spaced apart from the plurality of nozzles, each head extending from a conduit for dispensing a second precursor.

Other embodiments provide a method of forming a layer on a substrate by providing a slurry of an electrochemical deposition material to a processing chamber, providing a combustible gas comprising excess carbon to the processing chamber, forming nanocrystals of the electrochemical deposition material, and depositing the nanocrystals on a substrate.

Other embodiments provide a method of forming an electrochemical layer on a substrate by forming a slurry comprising an electrochemical precursor, the electrochemical precursor comprising lithium, atomizing the precursor mixture in an inert gas, flowing the atomized precursor and a combustible gas mixture comprising excess carbon into a processing chamber, reacting the combustible gas mixture to form nanocrystals of the electrochemical precursor coated with a carbon containing coating, flowing the nanocrystals in a stream out of the processing chamber toward the substrate, adding a polymer binder to the stream to form a deposition mixture, and depositing the deposition mixture on the substrate.

Other embodiments provide an apparatus for forming an electrochemical film on a substrate, the apparatus having a processing chamber enclosing a substrate support and a dispenser, the dispenser having a drying chamber in fluid communication with a precursor source and a combustible mixture source, an ignition source coupled to the drying chamber, and a binder spray port disposed near the substrate support and spaced apart from the dispenser.

Other embodiments provide an apparatus for forming an electrochemical film on a conductive surface of a substrate, the apparatus having a continuously moving substrate conveyor, and a dispenser disposed above the substrate conveyor, the dispenser having a nanocrystal formation chamber with a plurality of nozzles extending toward the substrate conveyor and oriented in a direction perpendicular to the direction of motion of the substrate conveyor, the nanocrystals formation chamber in fluid communication with one or more sources of electrochemical precursors, a source of combustible gas coupled to the nanocrystals formation chamber, and a plurality of heads disposed near the substrate conveyor and spaced apart from the plurality of nozzles, each head extending from a conduit for dispensing a second precursor.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments disclosed herein generally provide methods and apparatus for forming a film on a substrate. In one embodiment, the film may be an electrochemical film for a thin-film battery, such as a Li-ion battery, or supercapacitor device. A precursor or mixture of precursors comprising particles of an electrochemically active material is provided to a processing chamber, where energy is applied to bring the precursor or precursor mixture to a high-temperature state. The high temperature produces nanocrystals from the particles, which form a layer or film on the substrate surface.

Figure 1:
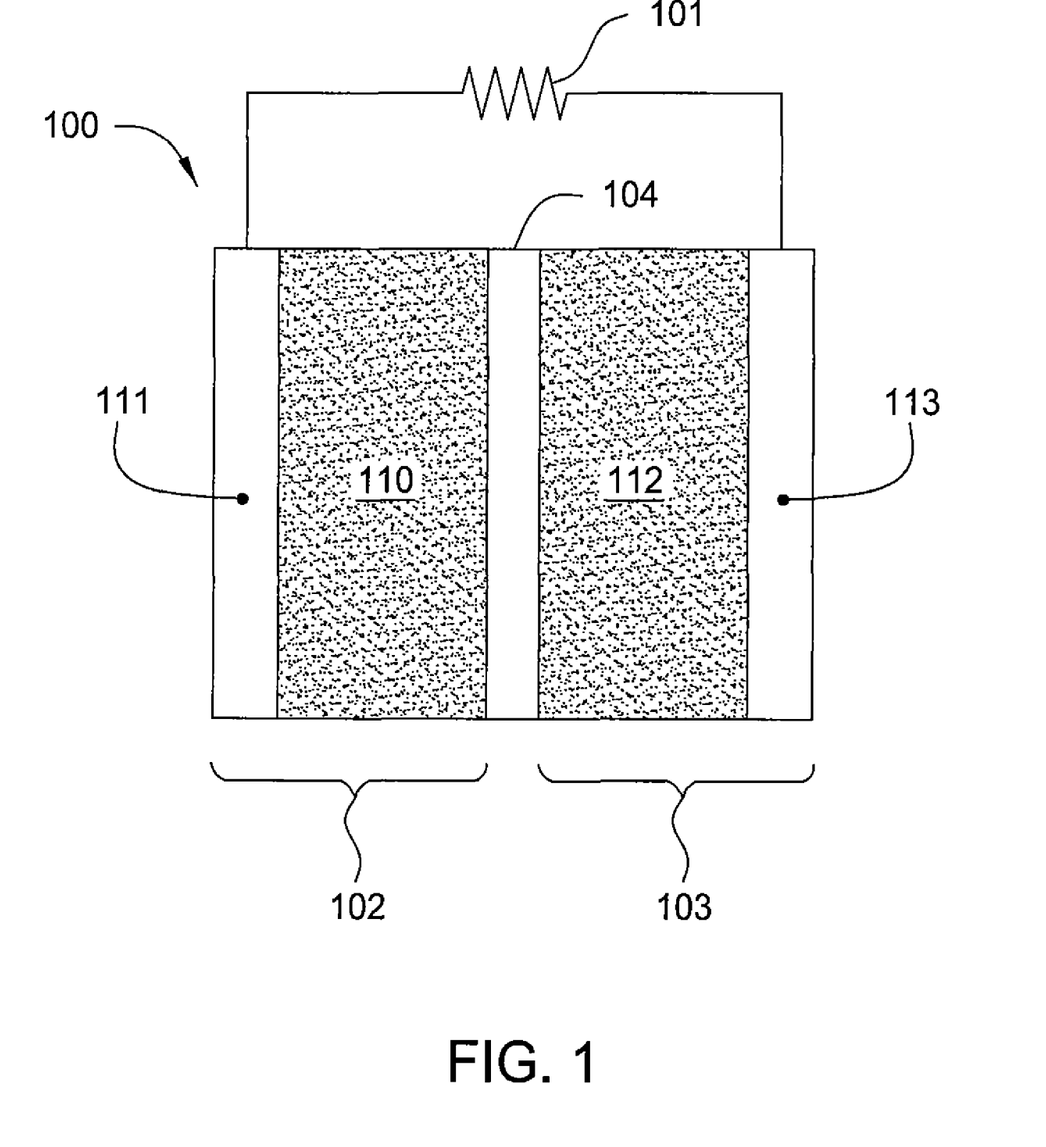
FIG. 1 is a schematic diagram of a Li-ion battery according to one embodiment.

FIG. 1 is a schematic diagram of a Li-ion battery 100 electrically connected to a load 101, according to an embodiment of the invention. The primary functional components of Li-ion battery 100 include an anode structure 102, a cathode structure 103, a separator layer 104, and an electrolyte (not shown) disposed within the region between the opposing current collectors 111 and 113. A variety of materials may be used as the electrolyte, such as a lithium salt in an organic solvent or a polymeric matrix, which may also be permeated by an organic solvent. The electrolyte is present in anode structure 102, cathode structure 103, and a separator layer 104 in the region formed between the current collectors 111 and 113.

Anode structure 102 and cathode structure 103 each serve as a half-cell of Li-ion battery 100, and together form a complete working cell of Li-ion battery 100. Anode structure 102 includes a current collector 111 and a first electrolyte containing material 110, such as a carbon-based intercalation host material for retaining lithium ions. Similarly, cathode structure 103 includes a current collector 113 and a second electrolyte containing material 112, such as a metal oxide, for retaining lithium ions. The current collectors 111 and 113 are made of electrically conductive material such as metals. In some cases, a separator layer 104, which may be a dielectric, porous, fluid-permeable layer, may be used to prevent direct electrical contact between the components in the anode structure 102 and the cathode structure 103.

The electrochemically active material on the cathode side of the Li-ion battery 100, or positive electrode, may comprise a lithium-containing metal oxide, such as lithium cobalt dioxide ($LiCoO_2$) or lithium manganese dioxide ($LiMnO_2$). The electrolyte containing material may be made from an oxide like lithium cobalt oxide, an olivine like lithium iron phosphate, or a spinel like lithium manganese oxide ($LiMn_2O_4$), formed in a layer on the positive electrode. In non-lithium embodiments, an exemplary cathode may be made from $TiS_2$ (titanium disulfide). Exemplary lithium-containing oxides may be layered lithium cobalt oxide, or mixed metal oxide, such as $LiNi_xCO_{1-x-y}Mn_yO_2$, $LiMn_2O_4$. Exemplary phosphates may be iron olivine ($LiFePO_4$) and it is variants (such as $[Li_xFe_{1-x}]_yMgPO_4$), $LiMoPO_4$, $LiCoPO_4$, $Li_3V_2(PO_4)_3$, $LiVOPO_4$, $LiMP_2O_7$, or $LiFe_{1.5}P_2O_7$. Exemplary fluorophosphates may be $LiVPO_4F$, $LiAlPO_4F$, $Li_5V(PO_4)_2F_2$, $Li_5Cr(PO_4)_2F_2$, $Li_2CoPO_4F$, or $Li_2NiPO_4F$. Exemplary silicates may be $Li_2FeSiO_4$, $Li_2MnSiO_4$, or $Li_2VOSiO_4$. An exemplary non-lithium compound is $Na_5V_2(PO_4)_2F_3$.

The electrochemically active material on the anode side of the Li-ion battery 100, or negative electrode, may be made from materials described above, namely graphitic microbeads dispersed in a polymer matrix. Additionally, microbeads of silicon, tin, or lithium titanate ($Li_4Ti_5O_{12}$) may be used with, or instead of, graphitic microbeads to provide the conductive core anode material.

Figure 2:
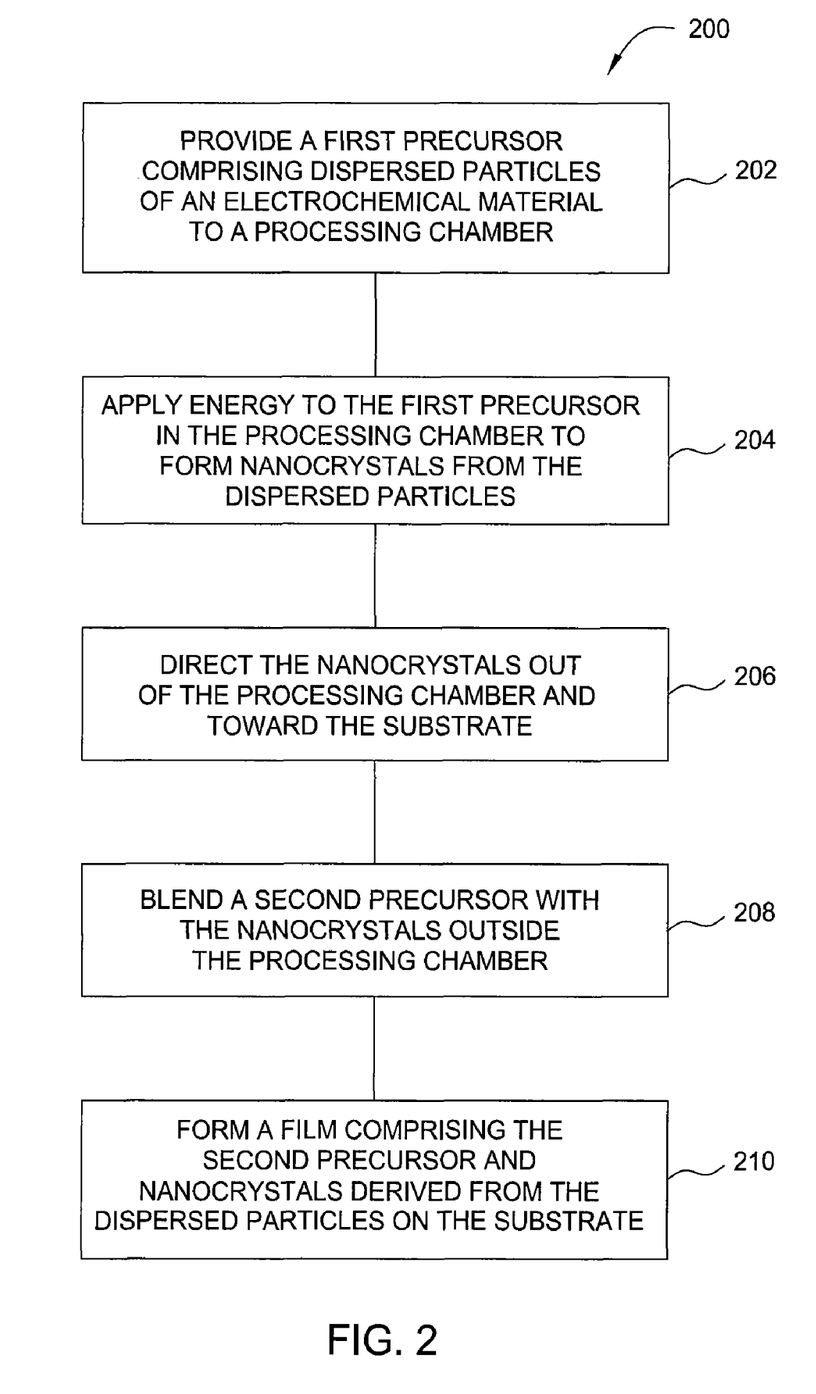
FIG. 2 is a flow diagram summarizing a method according to one embodiment.

FIG. 2 is a flow diagram summarizing a method 200 according to one embodiment. The method 200 is useful for forming a layer of an electrochemical agent, such as the electrochemically active materials, cathode and/or anode materials described above, on a substrate. The substrate may have a surface that comprises a conductive current collector for a battery structure, as described above with respect to FIG. 1. For example, the substrate may have a copper or aluminum electrode surface. At 202, a first precursor is provided to a processing chamber such as the heating chamber 308 of FIG. 3, further described below, through a conduit. The processing chamber may be a chamber of a dispenser, such as the dispensers 406 and 504 of FIGS. 4 and 5A, respectively. The first precursor comprises dispersed particles, which may be nanoparticles, having diameter between about 1 nm and about 100 nm, of an electrochemical material in a carrying medium. The particles generally include the components used to form the electrochemically active materials, cathode and/or anode materials, described above. A layer containing the electrochemical material deposited on the substrate will be referred to below as the deposited layer. In one embodiment, the carrying medium may be a liquid that is atomized by co-flowing with an inert gas such as argon, helium, or nitrogen through a small opening at high velocity before entering the processing chamber. The carrying medium may also nucleate around the electrochemical nanoparticles to reduce attachment to the walls of the processing chamber. Suitable liquid carrying media generally comprise oxygen, and include water and organic liquids such as alcohols. The liquid carrying media will generally have low viscosity, such as about 10 cP or less at a temperature between about 20° C. and about 50° C., to afford reasonable atomization.

At 204, energy is applied to the first precursor to raise its temperature and activate a crystallization process, forming nanocrystals from the particles dispersed in the first precursor. The energy excites thermal motion of atoms in the particles dispersed in the first precursor, causing them to move to preferentially find lower energy crystal lattice positions. In one embodiment, the energy is thermal energy generated by an exothermic reaction. A reactive mixture may be added to the first precursor to facilitate the thermal reaction. For example, oxygen may be added to the atomization gas, and a carbon containing fluid added to the liquid carrying medium.

In some embodiments, it may be advantageous to deposit carbon on the substrate with the electrochemical nanocrystals. Carbon can act as a binder for the deposited layer, and the conductivity of carbon improves film performance. Adding carbon through the carrying medium may also prevent vaporization of the electrochemical material particles during processing. Carbon may additionally be added to the deposited layer through use of a carbon containing gas, for example a hydrocarbon such as methane ($CH_4$) or acetylene ($C_2H_2$). Excess carbon in the reaction mixture will form amorphous carbon particles, which will remain in the deposited layer. Excess of carbon may also provide a reducing environment that prevents or retards oxidation of metals.

The residence time of particles in the reaction zone, and the heat transfer rate into the particles, are adapted to crystallize the particles without vaporizing them and to control particle size and particle size distribution. Residence time is also controlled to provide suitable deposition rate on the substrate. The heat transfer rate into the particles may be influenced by the particular mixture used and heat capacity of the components in the precursor material. For example, higher hydrocarbons, conjugated hydrocarbons, or cooler burning partially oxidized fuels such as alcohols, may be used to afford heat input at a slower rate, if desired. Additionally, use of a carrying medium with a higher viscosity to form a thicker covering over the particles, or use of a carrying medium with lower thermal conductivity, may reduce heat input into the particles. A carrying medium, such as water, with a high latent heat will also control heat input into the particles.

At 206, the stream of nanocrystals formed by applying energy to the particles dispersed in the first precursor are directed out of the processing chamber to a substrate to form a film on the substrate. The nanocrystals may be spread according to any desired pattern by engineering the precise flow pattern and movement of the processing chamber relative to the substrate surface, and the geometry of the portal through which the activated precursor exits the processing chamber or dispenser.

At 208, a second precursor is blended with the nanocrystal stream outside the processing chamber as the nanocrystals move toward the substrate. The second precursor is generally provided to facilitate binding the nanocrystals to the substrate. The second precursor may comprise a binding agent, such as a polymer, to hold the nanocrystals on the surface of the substrate. The binding agent will generally have some electrical conductivity to avoid diminishing the performance of the deposited layer. In one embodiment, the binding agent is a carbon containing polymer having a low molecular weight provided at a ratio of less than about 100 polymer molecules per nanocrystals. The low molecular weight polymer may have a weight average molecular weight of less than about 3,000,000 to promote adhesion of the nanoparticles to the substrate. The ratio of polymer molecules to nanocrystals provides space between the crystals and promotes adhesion without hindering the substantially free flow of electrons and ions through the deposited layer.

At 210 the nanocrystals and the binding agent are deposited on the substrate. A minimal quantity of binding agent occupies interstices between the nanocrystals to adhere them to the film while allowing free flow of electrons and ions through the deposited layer. In some embodiments, the substrate may be heated during formation of the film to encourage close settling of the nanocrystals before the binding agent, and any residual carbon deposited with the nanocrystals, hardens. Close settling of the nanocrystals is promoted by subsequent collision of nanocrystals emerging from the processing chamber so long as the binding medium has not become too resistant to movement.

Porosity of the deposited film may be controlled by adjusting the speed with which nanocrystals exit the dispenser apparatus. Increasing the speed generally lowers the porosity of the film. Size of the nanocrystals is controlled by degree of atomization. Finer atomization, for example by increasing pressure of the atomizing gas, results in smaller particles.

Figure 3:
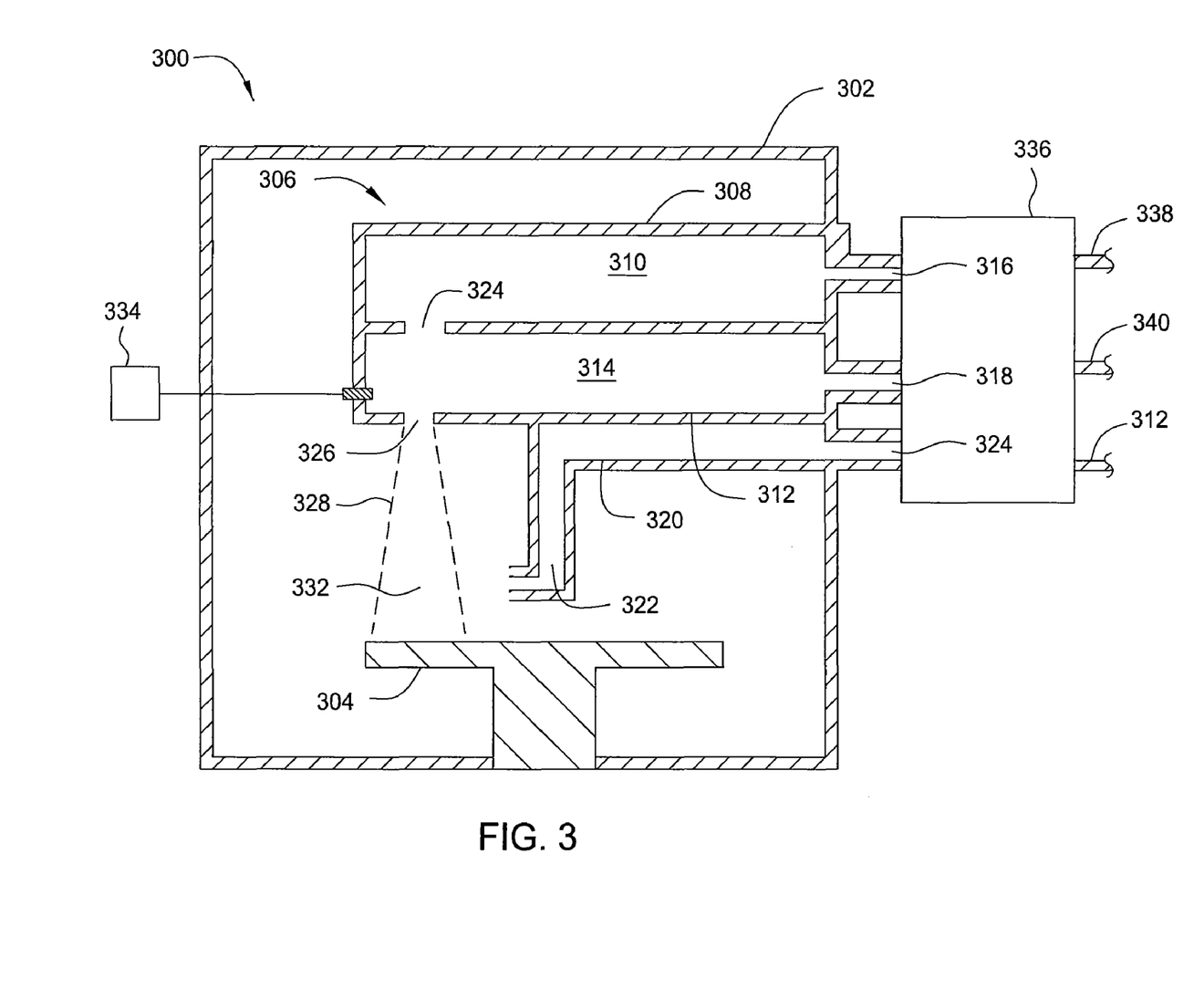
FIG. 3 is a schematic cross-sectional view of a film formation apparatus according to one embodiment.

FIG. 3 is a schematic cross-sectional view of a processing chamber 300 according to one embodiment. The processing chamber 300 comprises an enclosure 302, a substrate support 304, and a dispenser 306 for providing an activated material 328 towards a substrate disposed on the substrate support 304. The dispenser 306, which may be a distributor that dispenses nanocrystals according to a certain pattern, comprises a first chamber 308, a second chamber 312, and a conduit 320 for providing a binder, if desired. The first chamber 308 has an interior portion 310 in fluid communication with a first entry portal 316, through which flows a first precursor mixture. The first entry portal 316 is in fluid communication with a first precursor source (not shown) by a first source conduit 338 through a flow controller 336. The first entry portal 316 may be sized to atomize the first precursor mixture if the first precursor mixture is flowed at high speed through the first entry portal 316 with an atomizing gas.

A first opening 324 allows the precursor to flow from the first chamber 308 to the second chamber 312. The second chamber 312 has an interior portion 314 in fluid communication with the first chamber 308 and a second entry portal 318 for providing a combustible mixture to the second chamber 312. The combustible mixture is ignited by an ignition source 334, which may be a spark generator, disposed near an outlet 326 of the second chamber 312. The combustion reaction generates heat that dries the dispersed particles of electrochemical material and crystallizes them into nanocrystals. The dispenser 306 may be operated such that the precursor particles crystallize in the second chamber 312, outside the second chamber 312 as they travel to the substrate prior to their deposition on the surface of the substrate, or partially before depositing and partially after depositing. In some embodiments, electric energy may also be coupled to the walls of the first chamber and/or the second chamber to promote the thermal recrystallization process.

The mixture that exits the dispenser 306 through the second opening 326 comprises the stream of nanocrystals 328 to be deposited on the substrate, and is carried in a gas mixture that generally comprises combustion products. The gas mixture will generally contain water vapor, carbon monoxide and dioxide, and trace quantities of vaporized electrochemical materials, such as metals. At least some of the nanocrystals may also be partially or fully coated with carbon containing material, which may be derived from combustion of the carrying medium provided with the nanoparticle precursor. In one embodiment, the gas mixture comprises a non-reactive carrier gas component, such as argon (Ar) or nitrogen ($N_2$) that is used to help deliver the activated material to the substrate surface.

The conduit 320 is configured to provide a third precursor to be mixed with the nanocrystal stream 328 impacting the substrate surface. The third precursor may be a binding agent, a filler, a conductivity enhancer, or any or all thereof. In some embodiments, the third precursor is a sprayable polymer, which may be a polymer solution or slurry, provided near the point of contact between the activated material and the substrate surface.

Flow of the second and third precursors is also controlled by the controller 336, which may also be configured to manage the total carbon in the reaction mixture and/or the reaction temperature by adjusting the flow rate of the carbon containing gas.

In another embodiment, the binder may be provided with the first precursor. For example, the first precursor may comprise a slurry of metal oxide particles in water, with sugars and alcohol to provide carbon. A binder such as polyacrylic acid may be mixed with the aqueous first precursor, which is then provided to the combustion region of the dispenser. The particles are dried and recrystallized, and the polyacrylic acid and amorphous carbon particles coalesce around the nanocrystals to form a deposition spray. The deposition spray remains hot enough to maintain the polymer binder in an elastic condition until the nanocrystals are deposited on the substrate, after which the polymer binder sets as the film cools.

Figure 4:
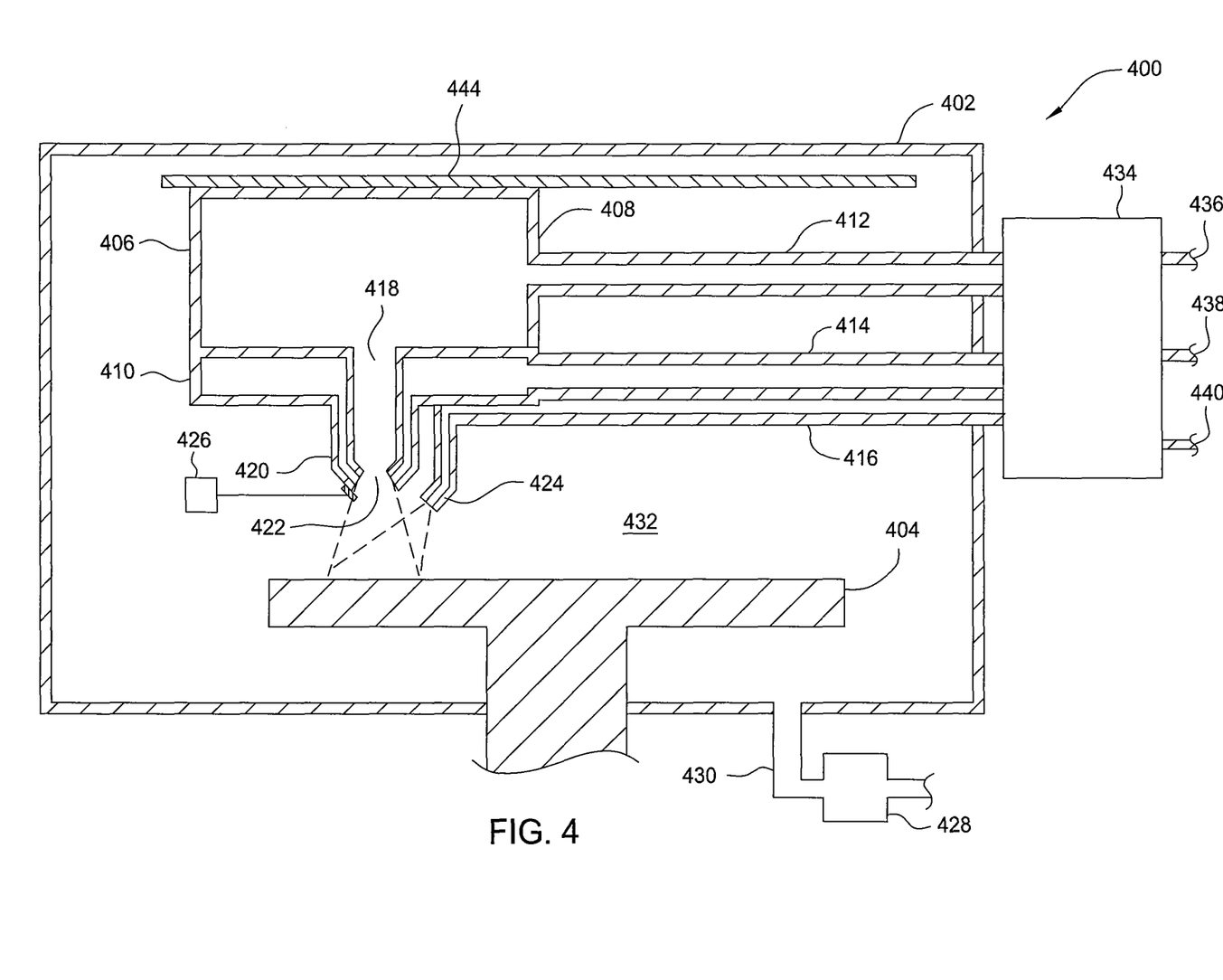
FIG. 4 is a schematic cross-sectional view of a film formation apparatus according to another embodiment.

In one embodiment, the activation chamber comprises a nozzle through which the precursor mixture exits into a mixing region. FIG. 4 is a schematic cross-sectional view of an apparatus 400 according to another embodiment. The apparatus 400 comprises a processing chamber 402, substrate support 404, and a dispenser 406, which in some embodiments may be a distributor that dispenses material according to certain desired patterns.

The dispenser 406 comprises a first chamber 408 and a nozzle 420, though which the precursor mixture exits the dispenser 406. A precursor mixture is provided to the first chamber 408 through a first portal 412 in fluid communication with a precursor source (not shown) through a first conduit 436, with flow rate controlled by a flow controller 434. The first portal 412 may comprise an atomizer for liquid, slurry, or suspension precursors. The nozzle 420 carries the precursor mixture from the first chamber 408 through an opening 418 to a mixing zone 422 near the end of the nozzle 420.

The mixing zone 422 may be an enclosure adjacent to the activation chamber 408 or a confined space configured to direct the gas mixture toward the substrate in a desired pattern. In one example, a combustible mixture is provided through an annular pathway 428 around the nozzle 420. The annular pathway 428 is configured to flow the combustible mixture into the stream of activated precursor in a uniform manner as it exits the nozzle 420. As the combustible mixture mixes with the activated precursor, a combustion reaction occurs in the mixing zone 422 generating heat and pressure to crystallize the precursor material into nanocrystals, vaporize the liquid carrying medium, and propel the stream of nanocrystals outward in a spread pattern to the substrate support 404. The precise geometry of the nozzle 420 and the mixing zone 422 may be adjusted to achieve any desired flow pattern or mixing method. The exact method of mixing devised may help control heat transfer into the nanoparticles. For example, a mixing method incorporating vortex flow of the combustible gas and the activated precursor may be useful in controlling application of heat from the combustion reaction to the nanoparticles.

Figure 5A:
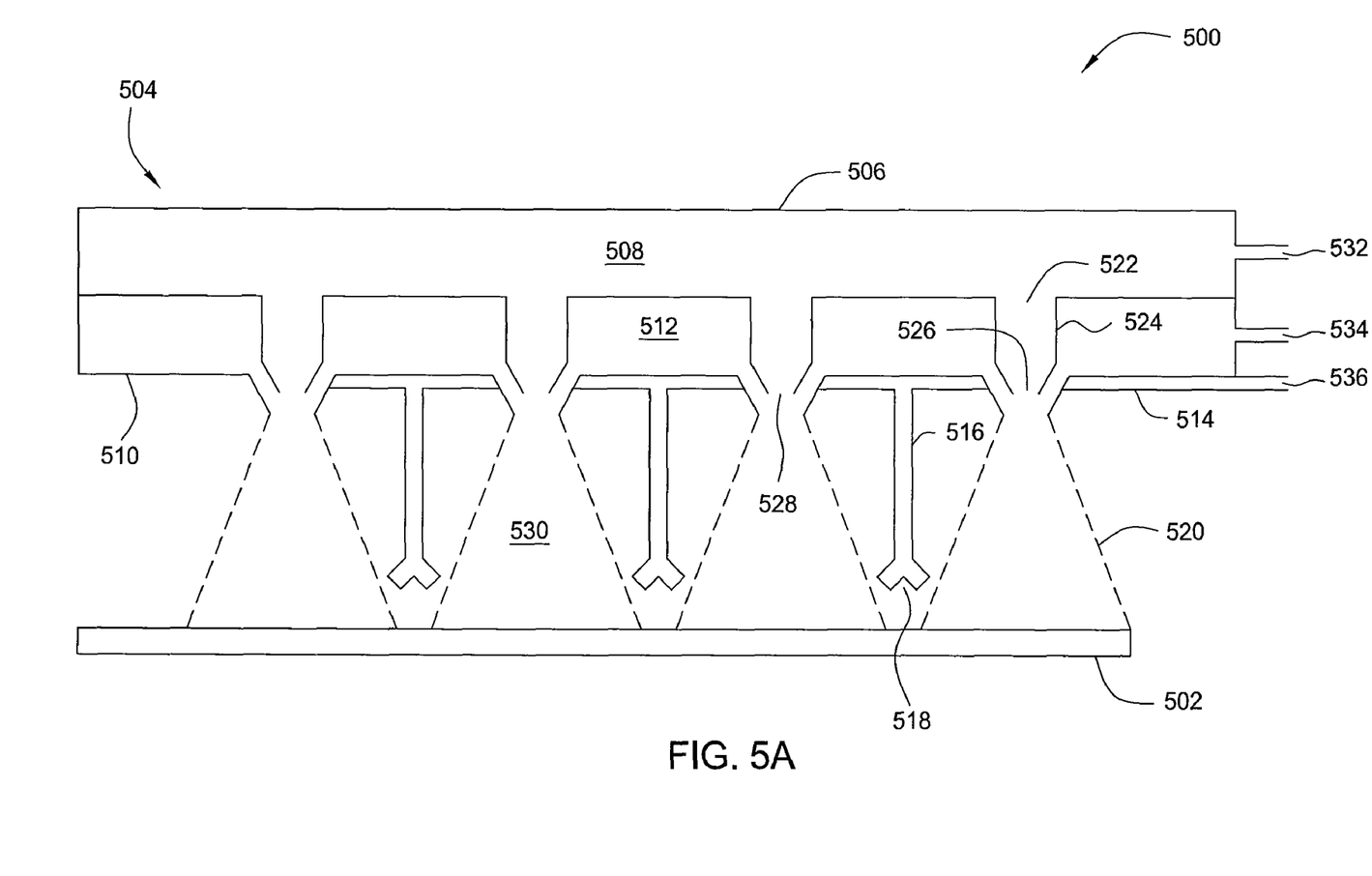
FIG. 5A is a schematic cross-sectional view of a film formation apparatus according to another embodiment.

The dispenser 406 further comprises a second conduit 414 through which a combustible gas mixture may be provided to the mixing zone 422, and a third conduit 424 through which a third precursor may be provided. The third precursor is provided for blending with the nanocrystals outside the dispenser 406 as the nanocrystals impinge on a substrate disposed on the substrate support disposed in a processing region 432 of the chamber 402 The third conduit 424 may have a distribution head configured to distribute the second precursor in a pattern that substantially overlaps the pattern of impact on the substrate by the activated material, such that the nanocrystals are secured to the substrate by the second precursor.

In the apparatus of FIG. 4, the dispenser 406 moves with respect to the substrate support 404 to form a film over all, or a substantial portion of, a substrate disposed on the substrate support 404. This may be accomplished by moving the dispenser 406, the substrate support 404, or both. In FIG. 4, the dispenser is configured to extend and retract across the chamber 402 using an actuator 444, which may be a precision x-y stage.

Exhaust gases leave the chamber 402 through an exhaust portal 430, which may have any convenient configuration. The portal 430 may be a single opening in a wall of the chamber 402, as shown in FIG. 4, or multiple such openings, or a circumferential exhaust channel disposed around a circumference of the chamber 402. The exhaust portal 430 comprises a particle trap 428 to prevent particles generated by the dispenser 406 from reaching vacuum pumps and other processing equipment downstream of the chamber 402. The particle trap 428 may be any suitable device, such as a filter or vortex separator.

In operation, an electrochemical layer for a battery may be deposited on a substrate but disposing the substrate on the substrate support 404 and establishing flow of the combustible gas mixture to the mixing region 422. The ignition source 426 may be used to ignite the combustible mixture, and the flow rate of the combustible mixture adjusted to maintain the combustion reaction. Flow of the precursor mixture to the mixing region is then established through the first chamber 406, which allows for atomization of the first precursor. The flow controller adjusts flow and composition of the combustible gas mixture to maintain temperature in the mixing region, which may be detected using a standard temperature sensor (not shown). If a separate flow of a binder material is used, flow of the binder material is then established through the portal 424 to deposit the electrochemical layer.

FIG. 5A is a schematic cross-sectional view of an apparatus 500 according to another embodiment. Like the apparatus of FIGS. 3 and 4, the apparatus 500 comprises a dispenser 504 and a substrate support 502 (the chamber enclosure is not shown in FIG. 5A). In the apparatus of FIG. 5A, the dispenser 504 comprises a plurality of nozzles 524 in fluid communication with an interior portion 508 of an activation chamber 506. A deposition precursor, such as those described above, containing activated material to be deposited on a substrate is provided through a conduit 532 in fluid communication with one or more sources of deposition precursors, which may feature an atomizer for liquid precursors. Activation may be performed as shown in FIGS. 3 and 4, using an electric field generator (not shown) coupled to a wall of the activation chamber 506. Isolators may be used as in other embodiments described herein to control and isolate the electric field to the activation chamber 506, if desired.

The activated material exits the activation chamber 506 through first openings 522 into nozzles 524, and then through second openings 526 into mixing regions 528 formed outside each nozzle 524. A combustible mixture may be provided to the mixing regions 528 through the nozzles 524 using conduit 534 in fluid communication with gas chamber 512 and a source of combustible gases (not shown). As described in connection with other embodiments discussed herein, the mixture of the activated material with the combustible mixture triggers a combustion reaction, which releases thermal energy, which causes the activated material to propagate toward the substrate 502 in spray patterns 530. In one configuration, precursor particles in the activated material crystallize forming nanocrystals prior to the deposition on the surface of the substrate. The spray patterns 530 are shaped by the nozzle geometry speed of gas flow, and speed of the combustion reaction, to cover substantial portions of a substrate disposed on the substrate support 502. A second precursor, similar to that described above, is provided through conduit 536, which is in fluid communication with portals 518 and one or more sources of the second precursor. The configuration of the portals 518 is designed to blend the second precursor with the activated material stream as it propagates toward the substrate 502 in the spray patterns 530, causing components, such as nanocrystals to be formed and/or bind to the substrate 502 as they impact thereon.

Figure 5B:
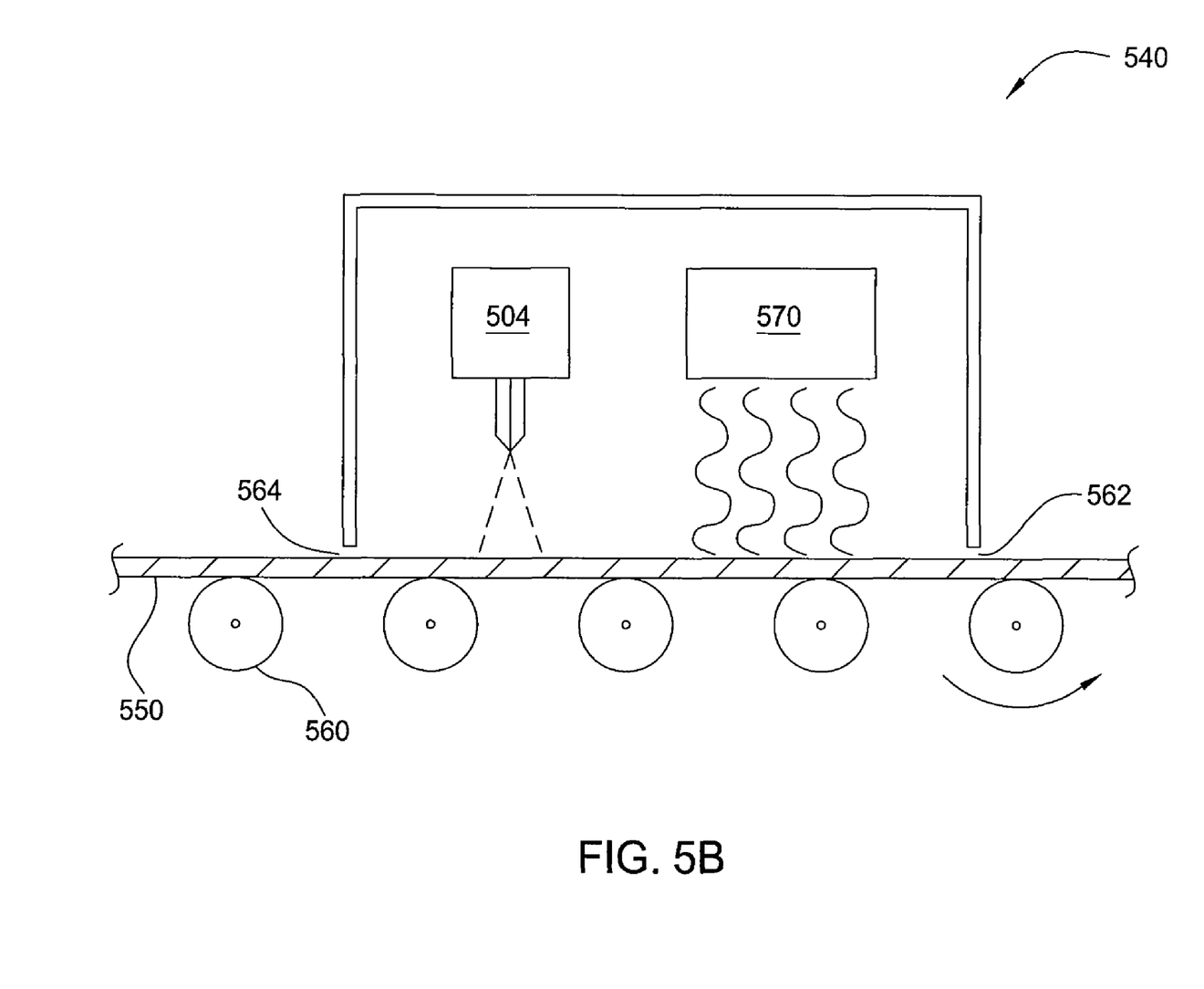
FIG. 5B is a schematic side view of a film formation apparatus according to another embodiment.

Alternately, a dispenser with multiple nozzles such as the dispenser 504 may be configured with all nozzles in a linear configuration, or in any other convenient configuration. To achieve full coverage of a planar substrate, the dispenser may be translated across the substrate while spraying activated material, or the substrate may be translated beneath the dispenser, or both, according to methods similar to that described above. FIG. 5B is a schematic side view of an apparatus 540 configured to translate a substrate along a conveyor 550 through a processing chamber having the dispenser 504 disposed across the travel path of the conveyor 550. A substrate enters the chamber through a first opening 562 and travels beneath a preheater 570, which heats the substrate to a target temperature selected to enhance formation of the electrochemical film by enhancing adhesion of the deposited layer to the substrate. The multiple nozzles of the dispenser 504 are oriented across the path of the substrate to cover the substrate uniformly as it travels beneath the dispenser. The conveyor generally moves by virtue of horizontal actuators such as the schematically represented rollers 560 of FIG. 5B. The substrate, having been covered with the electrochemical film, exits the chamber through a second opening 564 for further processing.

Figure 5C:
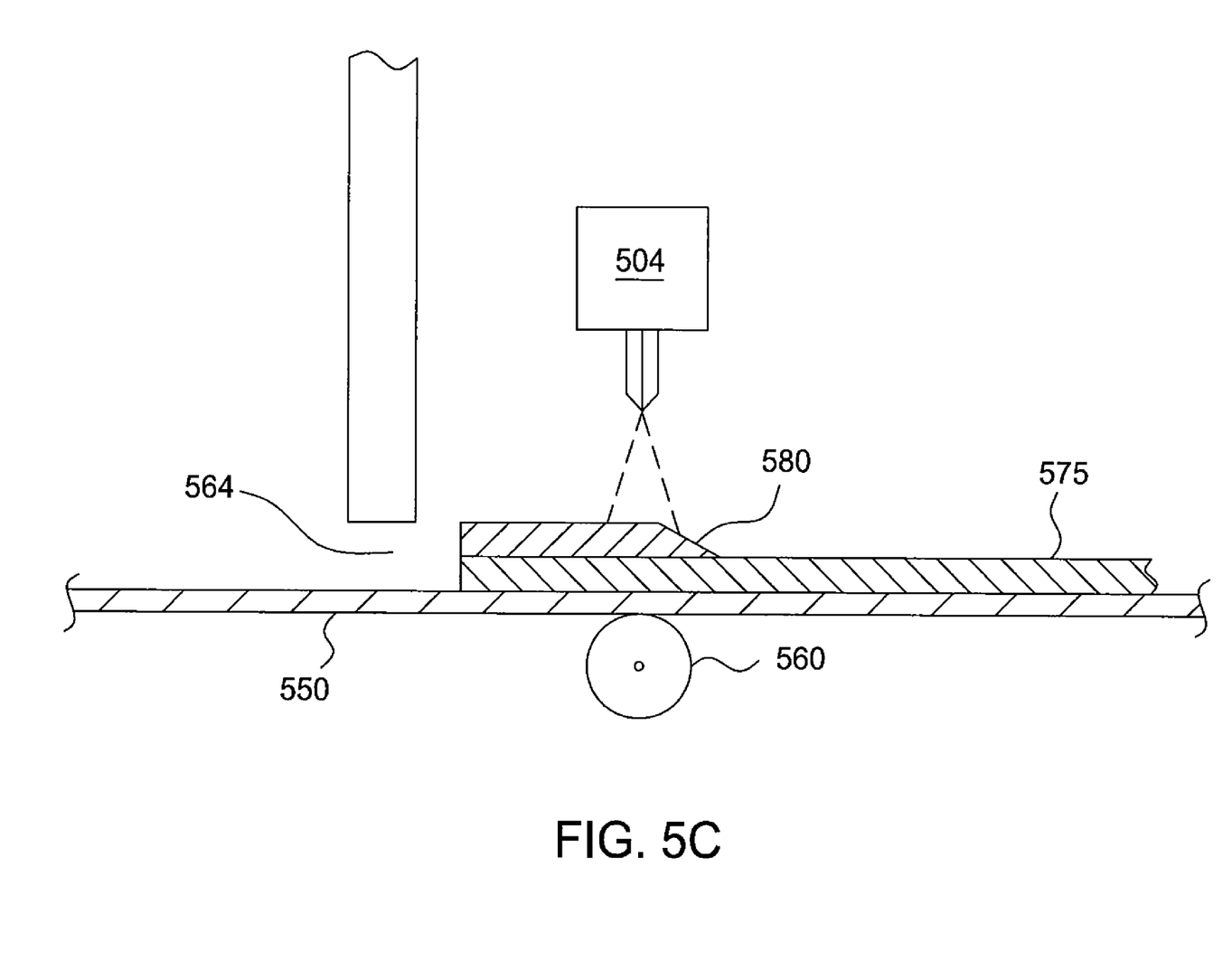
FIG. 5C is a close-up view of the apparatus of FIG. 5A.

FIG. 5C is a close-up view of the apparatus of FIG. 5A, with a substrate 575 disposed on the conveyor 550 for processing. As the substrate 575 is carried toward the second opening 564, the dispenser 504 dispenses material to form a deposited layer 580 on the substrate 575. As the substrate 575 travels beneath the dispenser 504, the deposited layer 580 grows from one edge of the substrate 575 to the other.

Figure 5D:
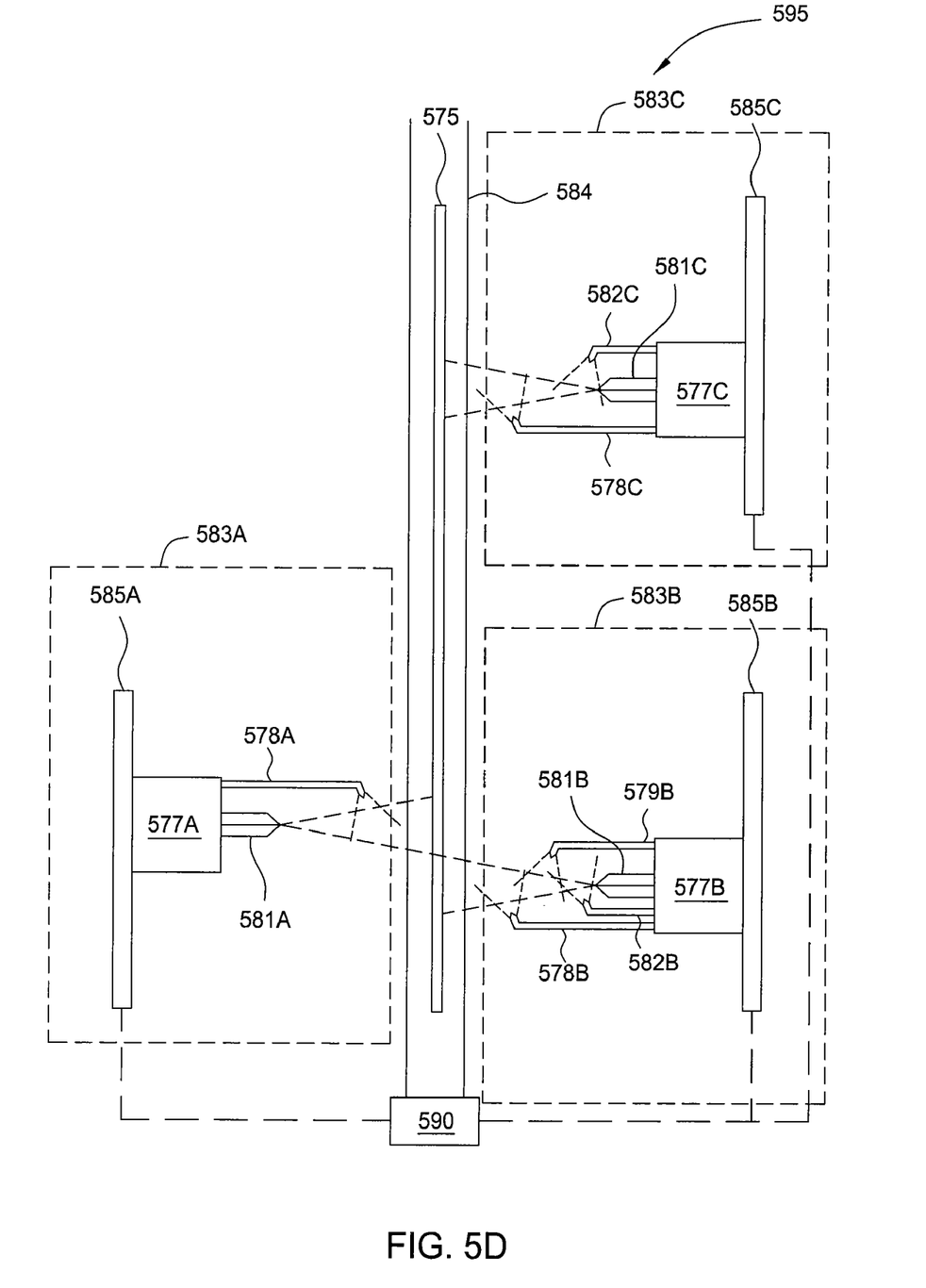
FIG. 5D is a schematic plan view of an apparatus according to another embodiment.

FIG. 5D is a schematic plan view of an apparatus 595 according to another embodiment. The apparatus 595 features a plurality of processing stations 583A-C, with a conveyance 584 for conveying a substrate 575 along the processing stations 583A-C. Each of the processing stations 583A-C has a dispenser 577 in an orientation facing the conveyance 584, and a substrate 575 thereon. Each of the dispensers generally conforms to the description of the dispenser 406 of FIG. 4, with certain optional variations. Each dispenser 577 has a main nozzle 581 for dispensing a stream of nanocrystals. Each dispenser 577 is shown with a first auxiliary nozzle 578, which may be for dispensing a binder material, positioned at a first distance from the main nozzle 581. Each of the dispensers 577B and 577C has a second auxiliary nozzle 578B and 578C, respectively, which may be used for dispensing a coating or a shell material, and which are positioned a second distance from the main nozzle 581. The dispenser 577B additionally has a third auxiliary nozzle 579B positioned a third distance from the main nozzle 581 for dispensing a coating material in addition to a shell material.

The first, second, and third distances may be the same or different, depending on the desired mixing location in the nanocrystal stream propagating from the dispenser 577. Additionally, more nozzles may be disposed proximate the nanocrystal stream path, if desired to deposit more materials or to provide certain mixing patterns. For example, one dispenser 577 may feature two nozzles for binder material disposed on opposite sides of the nanocrystal stream at the same distance from the dispenser or different distances from the dispenser. Nozzles for providing other materials may likewise be arranged in dual opposing configurations.

The processing stations 583 of FIG. 5D are shown disposed on opposite sides of the conveyance 584 for simultaneous or concurrent processing of two major surfaces of a substrate. Additionally, the processing stations 583B and 583C are shown in a sequential arrangement on one side of the conveyance 584 for sequential processing of the substrate 575. Such sequential processing enables layers of different materials to be applied sequentially to the substrate. For example, the processing station 583B may form a high capacity electrochemical layer on the substrate 575 by providing a shell material through the second auxiliary nozzle 582B, a coating material through the third auxiliary nozzle 579B and a binder material through the first auxiliary nozzle 578B. Then the processing station 583C may form a high stability electrochemical layer over the high capacity electrochemical layer, if desired, using the second auxiliary nozzle 582C to apply a coating material and the first auxiliary nozzle 578C to dispense a binder material.

In this way, successive layers having different composition may be formed on the substrate. In some embodiments, each of the processing stations 583 may have a plurality of dispensers 577 arranged along a line perpendicular to the direction of movement of the substrate 575 but parallel to the plane formed by the major surfaces of the substrate 575. Such an arrangement of dispensers at each processing station may enable each processing station to cover the substrate uniformly as it passes through the processing station. It should be noted that the dispensers 583A-C are shown having different nozzle configurations for illustration purposes. Some embodiments may have a plurality of identical dispensers, while others have different dispensers based on the desired films.

The orientation and location of the various nozzles in the apparatus 595 may be varied to control aspects of the deposited film. The mixing location of the various auxiliary nozzles into the nanocrystal stream may be changed by adjusting the distance of the auxiliary nozzles from the dispenser. Mixing characteristics may be changed by adjusting the exit speed of material from the auxiliary nozzle and the angle of the auxiliary nozzle with respect to the nanocrystal stream. The auxiliary nozzles may be arranged proximate the nanocrystal stream in any convenient arrangement, and the number of nozzles may be varied. Additionally, dispensers configured in a manner similar to the dispensers 577 of FIG. 5D may be disposed over a substrate supported in a horizontal configuration, for example on a conveyor such as the conveyor 55 of FIGS. 5B and 5C.

In one embodiment, a layer of electrochemically active material is deposited on a substrate in a thermal spray operation. An electrochemical deposition precursor material comprising particles of electrochemically active materials such as lithium metal oxides, which may be any of the electrochemically active compounds described herein, or a mixture thereof, in a water slurry, is exposed to thermal energy to form a stream of electrochemically active nanocrystals that deposit on the substrate. The slurry may be mixed with a carbon-containing fluid, such as an organic compound comprising oxygen and hydrogen, for example isopropyl alcohol, to form a precursor mixture. Sugars may be dissolved in the water carrying medium to add carbon to the mixture, as described above.

In a slurry embodiment, the precursor mixture is flowed into a processing chamber, which may be a drying chamber, at a flow rate between about 5 mL/min and about 100 mL/min, for example about 50 mL/min, and dried using thermal energy from a combustion reaction. The precursor mixture is typically atomized with a carrier gas such as nitrogen gas ($N_2$), hydrogen gas ($H_2$), helium (He), argon (Ar), or a mixture thereof, at a pressure between about 10 psi and about 30 psi. Oxygen or air may also be used as an atomizing gas, if desired to promote combustion. Use of oxygen or air as an atomizing gas may allow fuel gas to be provided separately to the dispenser, the fuel and oxygen only mixing in the reaction zone of the dispenser.

A combustible gas mixture is provided in the mixing zone of the dispenser. For example a mixture of oxygen with one or more hydrocarbons such as methane, ethane, acetylene, propane, or another fuel, may be added to the precursor mixture or separately provided to the process chamber. Alternately, oxygen or air may be added to the precursor mixture and the hydrocarbon provided through a separate conduit. The combustible gas mixture is reacted to provide thermal energy for forming the nanocrystals. The thermal energy vaporizes any remaining liquid in the reaction mixture and recrystallizes the electrochemical precursor to form a stream of nanocrystals that exit the processing chamber and travel toward the substrate.

Excess carbon may be added to the reaction mixture to facilitate forming a carbon containing coating on the nanocrystals. The excess carbon agglomerates around the nanocrystals as they form, and provide thermal insulation for the formed nanocrystals to prevent any unwanted thermal effects on the formed nanocrystals. Energy input to the electrochemical precursor, and/or chamber temperature, may be controlled by adjust the amount of excess carbon in the reaction mixture. Specific heat of the excess carbon absorbs a portion of the thermal energy from the combustion mixture, and a thicker carbon coating on the nanocrystals reduces thermal input to the nanocrystals. Additionally, carbon deposition in the final film may improve the electrical properties of the film and promote adhesion of the nanocrystals to the substrate. A hydrogen containing carrier gas may also be used to control temperature in the chamber because the hydrogen reacts with oxygen in the reaction mixture. The temperature in the processing chamber is typically maintained between about 600° C. and about 1,500° C., such as between about 800° C. and about 1,200° C., for example about 1,000° C.

The precursor mixture comprises an electrochemically active material having the general formula $LiNi_wMn_xCO_yO_z$, wherein w, x, and y are each between about 0.3 and 1.5 and z is between about 1.5 and 2.5. The nanocrystals exit the processing chamber entrained in a stream of hot gas. In one embodiment, the nanocrystals exit the processing chamber at a velocity of between about 10 m/sec and about 600 m/sec., such as about 100 m/sec. the stream forming a jet having a length between about 0.1 and 1.5 m, such as about 1 m. The substrate is generally positioned between about 0.1 and 1.5 m from the processing chamber.

A binder is injected into the stream exiting the processing chamber. The binder is typically a polymer that facilitates adhesion of the nanocrystals to the substrate, and may also provide some desirable electrical properties in some embodiments. The binder is typically provided as a liquid, for example a solution, suspension, or emulsion. In one embodiment, the binder is a modified styrene-butadiene rubber material in a water emulsion. Flow rate of the binder precursor is generally between about 10% and about 75%, for example about 30%, of the flow rate of the electrochemical precursor to the processing chamber. The binder is mixed in with the stream of nanocrystals at a location selected for its energy content. The residual heat in the nanocrystal stream vaporizes the solvent or continuous phase of the liquid, freeing the binder to contact the nanocrystals. The processing chamber exit and the substrate together define a nanocrystal spray distance, while the processing chamber exit and the binder injection point together define a binder injection distance. In most cases, the binder injection distance is between about 60% and about 90% of the nanocrystal spray distance, for example between about 70% and about 80%.

The electrochemical precursor may be any of the electrochemically active species described herein, or a combination thereof. In most cases, the electrochemically active precursor comprises lithium, and may also comprise nickel, manganese, cobalt, or a mixture thereof. Different electrochemical precursors may be used to deposit layers having different characteristics. A high capacity layer may be formed by depositing a lithium based material rich in nickel. Using the formula above, if w is greater than about 0.5, the deposited layer will be a high capacity layer. If x is above about 0.5, the deposited layer will be a high stability layer. In some embodiments, a composite layer may be deposited by changing the composition of the electrochemical precursor during deposition. By providing different precursors at different times during deposition, a composite layer having a high capacity core with high stability outer layers may be formed.

While the foregoing is directed to embodiments of the invention, other and further embodiments of the invention may be devised without departing from the basic scope thereof.

What is claimed is:
1. A method of forming a layer on a substrate, comprising:
providing a slurry of an electrochemical deposition material to a processing chamber;
providing a combustible gas comprising carbon to the processing chamber;

forming nanocrystals of the electrochemical deposition material;

depositing the nanocrystals on a substrate; and flowing the nanocrystals out of the processing chamber toward the substrate in a stream, and adding a binder to the stream.

2. The method of claim 1, wherein the electrochemical deposition material comprises lithium and at least one of nickel, manganese, and cobalt.

3. The method of claim 1, wherein the slurry of the electrochemical deposition material comprises a carbon containing liquid.

4. The method of claim 1, wherein forming the nanocrystals of the electrochemical deposition material comprises forming a carbon containing coating on the nanocrystals.

5. The method of claim 1, further comprising controlling thermal energy input into the electrochemical deposition material by adjusting the amount of carbon in the combustible gas.

6. The method of claim 1, wherein the electrochemical deposition material comprises lithium, nickel, manganese, cobalt, and oxygen, and the binder is a polymer added to the stream of nanocrystals as a water emulsion.

7. The method of claim 6, wherein the nanocrystals are coated with a carbon containing coating and the binder is added by mixing the water emulsion into the stream of nanocrystals at a location that vaporizes the water.

8. A method of forming an electrochemical layer on a substrate, comprising:

forming a slurry comprising an electrochemical precursor, the electrochemical precursor comprising lithium;

atomizing the precursor mixture in an inert gas;

flowing the atomized precursor and a combustible gas mixture comprising carbon into a processing chamber;

reacting the combustible gas mixture to form nanocrystals of the electrochemical precursor coated with a carbon containing coating;

flowing the nanocrystals in a stream out of the processing chamber toward the substrate;

adding a polymer binder to the stream to form a deposition mixture; and depositing the deposition mixture on the substrate.

9. The method of claim 8, wherein the electrochemical precursor further comprises nickel, manganese, and cobalt.

10. The method of claim 8, wherein the slurry further comprises water and a carbon-containing liquid.

11. The method of claim 10, wherein the electrochemical precursor further comprises nickel, manganese, and cobalt.

12. The method of claim 11, wherein adding the polymer binder comprises mixing a water emulsion of the polymer binder with the nanocrystals stream at a location that vaporizes the water.

13. The method of claim 12, further comprising controlling thermal energy input into the electrochemical precursor by adjusting the amount of carbon in the combustible gas mixture.

14. The method of claim 10, wherein forming the nanocrystals comprises vaporizing the water and combusting the carbon-containing liquid.

15. The method of claim 14, further comprising controlling thermal energy input into the electrochemical precursor by adjusting a total amount of carbon added to the processing chamber in the combustible gas mixture and the slurry.

* * * * *